(No Model.)
H. N. MARVIN.
GENERATOR FOR ELECTRICALLY RECIPROCATED TOOLS.
No. 429,729. Patented June 10, 1890.
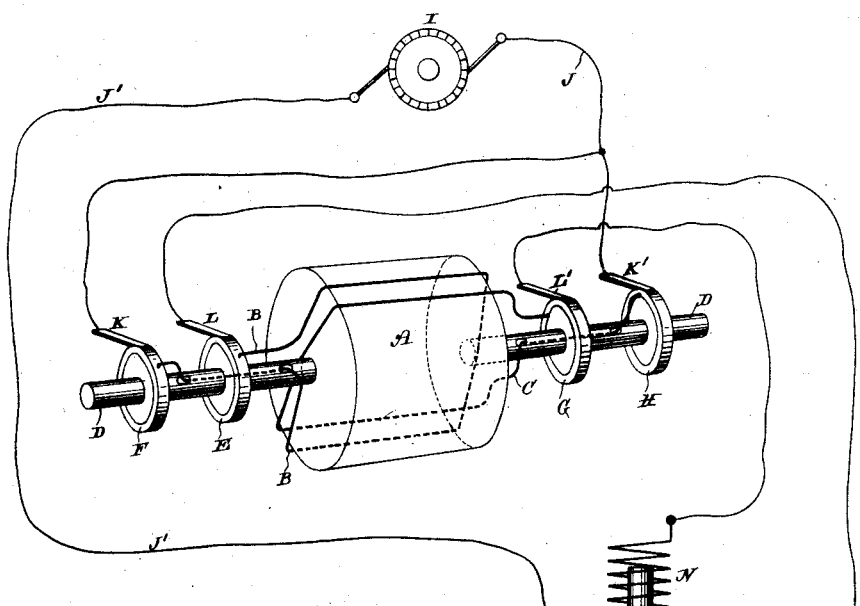
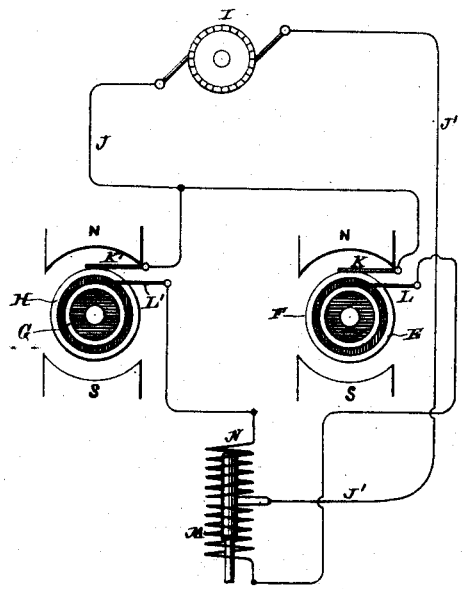
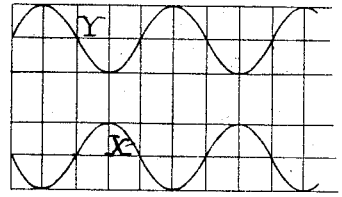
Witnesses:
Raphael Netter
Ernest Hopkinson
Inventor
Harry N. Marvin
by
Duncan, Curtis & Page
Attorneys.

UNITED STATES PATENT OFFICE.

HARRY N. MARVIN, OF SYRACUSE, NEW YORK.

GENERATOR FOR ELECTRICALLY-RECIPROCATED TOOLS.

SPECIFICATION forming part of Letters Patent No. 429,729, dated June 10, 1890.

Application filed March 19, 1890. Serial No. 344,480. (No model.)

*To all whom it may concern:*

Be it known that I, HARRY N. MARVIN, a citizen of the United States, residing at Syracuse, in the county of Onondaga and State of New York, have invented certain new and useful Improvements in Generators for Electrically-Reciprocated Drills, of which the following is a specification, reference being had to the drawings accompanying and forming a part of the same.

The subject of this application is an improved form of generator for electric drills. The system to which said generator is applicable may, in general terms, be described as follows: One or more drilling tools, each consisting of a magnetic core or plunger carrying a suitable tool and provided with oppositely-acting solenoids or coils, is connected up with two electric circuits, through which current impulses or alternations are directed in alternation or with such difference of phase that a preponderance of magnetic energy in the two coils alternately will produce a reciprocation of the core and of the tool attached thereto.

The means which I have devised for producing the necessary currents or current-impulses, and for which I now seek a patent, are as follows: I employ an alternating-current machine having two windings on its armature and four collecting-rings, to which the terminals of the two coils or windings are respectively attached. With such machine is associated a direct or continuous current machine, one portion or branch of the circuit of which is divided and carried by suitable connections through the two circuits of the alternating-current machine in such way or direction that while the current in one coil will be opposed by the direct current it will be reenforced in the other. The other branch of the circuit from the continuous-current machine leads to the junction of the two drill-coils, and the ends of these latter are connected to the free terminals of the alternating-current generator. As a consequence, each drill-coil will receive an undulating or alternating current of rising and falling potential, the periods of maximum potential of one current coinciding with the minimum periods of the other and conversely. This may be easiest explained by reference to the drawings.

Figure 1 is a diagram showing the parts or elements of the system with their electrical connections. Fig. 2 is a development of the same, illustrating the principle of action or operation. Fig. 3 is a diagram of the current-curves.

A is the armature of an alternating-current machine wound with two coils B and C, arranged to produce currents of the same phase. The shaft D of the armature carries four collecting-rings E F G H, the first two connected with the respective terminals of coil B, the others with those of coil C.

I is a generator or source of continuous currents, one of the conductors from which, as J, is divided and connected to brushes K K' that bear on rings F H, which rings are of opposite sign.

Brushes L L' conduct the currents from rings E G to the coils M N of a drill or drills, the circuit being completed through the second wire J' back to the continuous-current generator.

Such a disposition as above described operates in the following manner: By the rotation of the armature A the electro-motive force of each coil or winding B C is alternately added and opposed to that of the continuous-current generator I in the two branches of its circuit, respectively. Assume now that the armature is in the position of a beginning of a period or current alternation. Then the current from generator I is passed through each drill-coil without modification. For convenience it will be assumed that this is a current of one hundred volts. The maximum electro-motive force of the armature A may be further assumed to be one hundred volts. As the armature A rotates, the electro-motive force developed by one of the coils, as B, which is connected with rings E F, is of such sign as to make brush K of positive and brush L of negative sign; hence the electro-motive force in this branch of the circuit opposes that of the generator T. The electro-motive force of the coil C, on the other hand, from the order of the connections of said coil with brushes K' L', makes brush L' positive and brush K' negative. The electro-motive force of the generator I, therefore, through coil B, meets an increasing opposition, while that through the coil C is gradually re-enforced or augmented. When the armature A has made one quarter of a turn, the opposing and re-enforcing electro-motive force developed by its coils has reached its maximum or has become one hundred volts, which is the same as that developed by the generator T. The impressed electro-motive force of the circuit through the coil B has therefore become zero, while that through coil C has become maximum or two hundred volts. The rings then change sign, and the electro-motive force of the circuit through coil B is therefore assisted, while that through coil C is opposed; hence the electro-motive force through coil B continues to rise through the next quarter of a revolution up to a maximum, while that of coil C, which is opposed, falls to zero. This action continues alternately, as will be now understood. The curves of the currents from coils B and C are represented by X and Y, respectively, in Fig. 3. This arrangement or combination may be varied in many ways. For example, two alternating-current machines or sources of electro-motive force may be employed, as indicated in Fig. 2, as the same conditions of phase are preserved.

The system has certain advantages of considerable importance, as commutators for directing the current into the two drill-circuits are dispensed with and sparking avoided. It will also be observed that the coils of the drill are each continuously supplied with pulsating-currents, the direction of which is always the same. The magnetism of the drill-core is therefore never reversed, and the resultant magnetizing effect of the currents upon the bar is always about the same. The drill, it will be further observed, makes one stroke for each complete revolution of the armature A.

In practice the alternating-current machine may be located in the vicinity of the drill or drills, and the generator I at any desired distance therefrom, or other arrangements made, as will be understood, to meet the special conditions or requirements of particular localities and circumstances.

What I claim in this application as an improvement in the above-described system of operating-drills is—

1. The combination, with a drill or reciprocating tool having two opposing magnetizing-coils, of a source of continuous currents connected with said coils, and a source of rising and falling electro-motive force of opposite sign or direction included in or connected with the two drill-circuits, respectively, as set forth.

2. The combination, with the two energizing-circuits of a reciprocating drill or drills, of a continuous-current generator connected with the said circuits, and sources of alternating currents coinciding in phase but differing in direction included in the two circuits, respectively, as herein set forth.

3. The combination, with the two energizing-circuits of a reciprocating drill or drills, of a continuous-current generator connected therewith, and an alternating-current generator having two armature or induced coils adapted to produce current alternations coinciding in phase and connected up in different order in the drill-coils, respectively, as herein set forth.

HARRY N. MARVIN.

Witnesses:
A. A. SCHENCK,
HY. SHAW.